Dec. 22, 1959 W. B. KIRK 2,917,900
MASTER CYLINDER FOR HYDRAULIC BRAKE SYSTEM
Filed Oct. 2, 1957
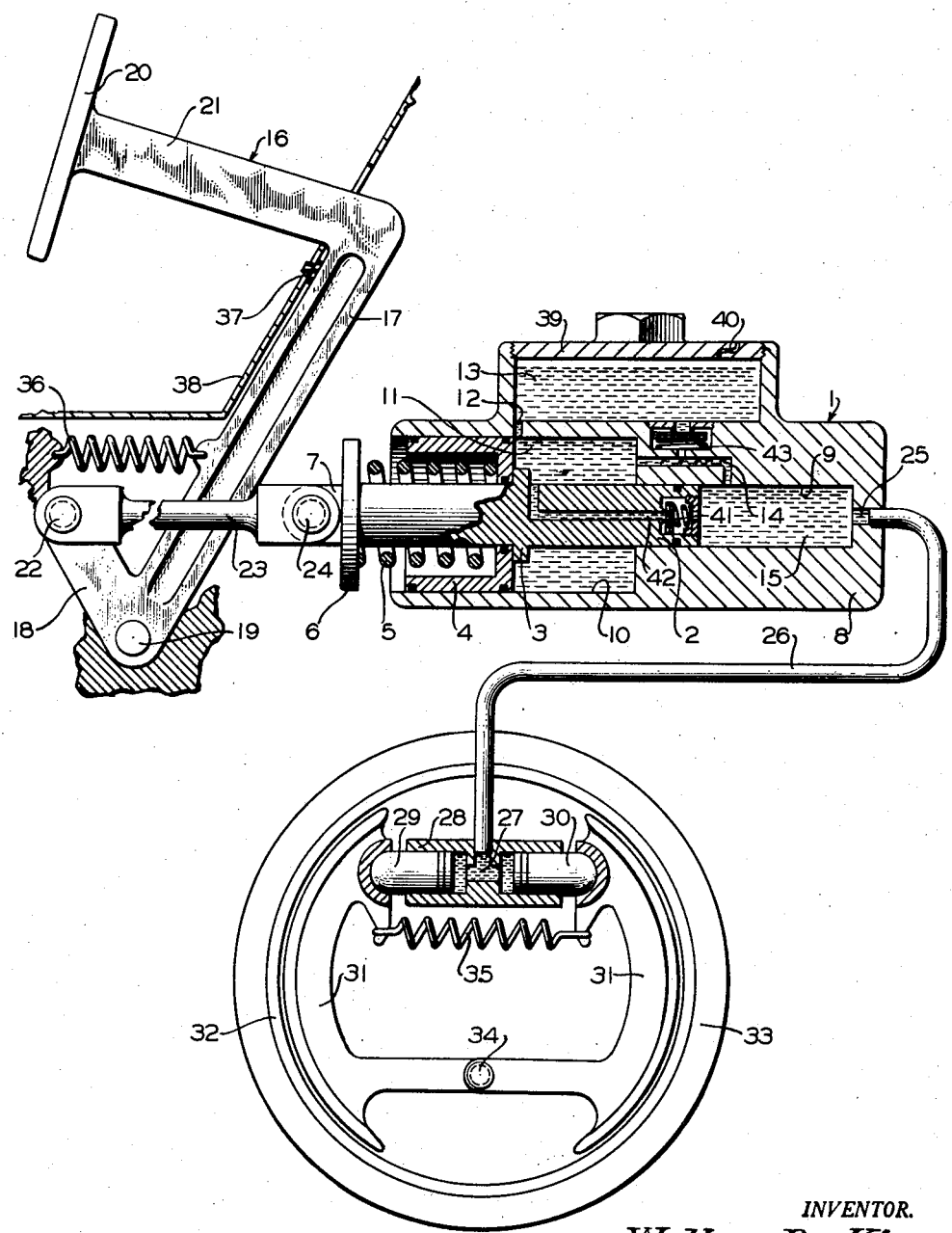
INVENTOR.
Walter B. Kirk
BY
Adelbert A. Steinmiller
ATTORNEY

United States Patent Office 2,917,900
Patented Dec. 22, 1959

2,917,900

MASTER CYLINDER FOR HYDRAULIC BRAKE SYSTEM

Walter B. Kirk, East McKeesport, Pa., assignor to Westinghouse Air Brake Company, Wilmerding, Pa., a corporation of Pennsylvania Application October 2, 1957, Serial No. 687,754

2 Claims. (Cl. 60—54.6)

This invention relates to hydraulic system actuators for hydraulic brake systems, hydraulic jacks, hydraulic presses and the like, and more particularly relates to an improved master cylinder for an hydraulic brake system.

Conventional type master cylinders employ a single piston of compromise diameter which must be large enough to effect reasonable displacement of hydraulic fluid without excessive brake pedal movement and yet small enough to obtain a reasonably high hydraulic braking pressure without requiring the application of an undue amount of force to the brake pedal.

The principal object of this invention is to provide an improved dual piston master cylinder which responds to a given degree of brake pedal movement to initially produce greater displacement of hydraulic fluid than is obtained with the conventional single master cylinder piston, and which after the braking elements have engaged the rotary member to be braked, develops for a given degree of brake pedal force a higher braking pressure than is obtained with said conventional single piston.

Other objects and advantages will become apparent from the following more detailed description of the invention and from the accompanying drawing, wherein the single figure is an elevational view, primarily in section, of a master cylinder embodying the invention and shown associated with an hydraulic brake system.

Description

As shown in the drawing, a master cylinder 1 embodying the invention comprises an elongated cylindrical relatively small diameter piston 2 having an outer driven end, an inner end, and an integrally formed circumferential collar 3 therebetween, and also comprises an annular cup-shaped substantially larger diameter piston 4 encircling piston 2 intermediate the driven end and collar 3 and having sealing and slidably guided telescoping contact with piston 2. For normally biasing piston 4 into contact with the collar 3 of piston 2, a bias spring 5 is interposed between the recessed outer face of the cup-shaped piston 4 and an annular disc-shaped coaxially arranged spring retainer 6 suitably secured to the driven end of piston 2 by an eye bolt 7 that has screw-threaded engagement within an internally threaded centrally arranged bore (not shown) formed in the driven end of piston 2.

Pistons 2, 4 are reciprocably disposed in a casing 8 having an open end through which pistons 2, 4 are inserted. Piston 2 adjacent its inner end has sealing, slidably guided contact with the wall of a bore 9; and piston 4 has sealing, slidably guided contact with the wall of a larger bore 10, that is arranged coaxially with bore 9 and extends inwardly from the open end of casing 8.

Defined between the inner face of piston 4 and inner end of bore 10 is an annular chamber 11 encircling piston 2 and normally open, by way of a compensating port 12 through the side wall of bore 10, to an hydraulic fluid reservoir 13 formed within the casing 8 and disposed above chamber 11 so that hydraulic fluid can flow from the reservoir 13 by gravity and completely fill chamber 11. A passage 14 leads from the inner end wall of chamber 11 and opens through the side wall of bore 9 for normally connecting chamber 11 to a chamber 15 that is defined between the inner end of piston 2 and base of bore 9.

A braking lever 16, in the nature of a bell crank, comprises a long arm 17 and a short arm 18, and is rockably fulcrumed at its knee about a pin 19 carried by a fixed member, such as the vehicle frame. A brake pedal 20 is rigidly connected by a brake pedal arm 21 to the outer end of the long arm 17 of lever 16. The short arm 18 of lever 16 is pivotally connected, by a pin 22, to one end of a relatively long connecting rod 23 that at its opposite end is bifurcated and pivotally connected, and thereby operatively connected, to piston 2 by means of a pin 24 through the eye bolt 7; the axes of pins 22 and 24 being parallel to the axis of pin 19.

Chamber 15 of master cylinder 1 is constantly open, via a casing port 25 through the casing wall at the base of bore 9 and a conduit 26, to a chamber 27 defined in a wheel brake cylinder sleeve 28 intermediate two spaced brake cylinder pistons 29, 30. Hydraulic pressure in chamber 27 forces pistons 29 and 30 outwardly for causing the round-nosed ends of said pistons respectively engaged in recesses in oppositely arranged convexly curved braking elements 31, to expand said braking elements into surface contact with a brake drum 32 that is secured for rotation with a wheel 33 to be braked; said braking elements being pivotally connected to each other by an anchor pin 34 and suitably supported by conventional guide means (not shown). A helical release spring 35 is connected at its respective ends to each of the braking elements 31 for normally urging them toward each other and out of engagement with the brake drum 32.

The bias effect of spring 5 is at least equal to and may be slightly more (but not less) than the bias effect of spring 35 when stretched, so that piston 4 will move in unison with piston 2 under action of spring 5 until the hydraulic pressure in the system is sufficient to bring the braking elements 31 into contact with the drum 32 against resistance of spring 35, as will be understood from subsequent description of operation.

Operation

In operation, assume that the braking lever 16 is biased by a return spring 36 to a release position which is defined by the long arm 17 contacting a suitable resilient stop 37 attached to a fixed member, such as the floor board 38 of a vehicle; said return spring 36 being secured at one end to the long arm 17 and at the opposite end to a fixed member, such as the frame of the vehicle, for biasing the lever 16 counterclockwise about pin 19. With the braking lever 16 in release position, the connecting rod 23 and pistons 2, 4 will be in their left-hand limit positions wherein annular chamber 11 is open to the fluid supply reservoir 13 via compensating port 12 and is open to chamber 15 via passage 14. Assume also that chamber 27, conduit 26, chamber 15, passage 14, chamber 11, and port 12 are completely filled with hydraulic fluid from the reservoir 13, which reservoir has been substantially filled with hydraulic fluid by way of a suitable filling plug 39, said reservoir also having the usual atmospheric breather port 40.

To effect an application of brakes, the operator applies a force to the brake pedal 20, for causing the braking lever 16 to be rocked in a clockwise direction against resistance of return spring 36. During this movement of the braking lever 16, piston 2 will be shifted to the right, through the medium of lever arm 18 and eye bolt 7. As piston 2, and hence retainer 6, is shifted rightward, piston 4 will be correspondingly shifted and maintained in contact with collar 3 by the force of spring 5, for rapidly displacing hydraulic fluid, some of which will tend initially to be displaced via the compensating port 12 into the reservoir 13 until the piston 4 during its initial phase of rightward movement laps off port 12; whereupon, during continued rightward movement of piston 4, hydraulic fluid will be displaced from chamber 11 via passage 14 to chamber 15 and also by smaller piston 2 from chamber 15 for rapidly, and without undue pedal force, pushing a solid column of hydraulic fluid through conduit 26 to chamber 27 for causing pistons 29, 30 to move outwardly to bring the braking elements 31 into contact with the brake drum 32 against resistance of spring 35. As soon as the braking elements 31 engage the drum 32, displacement of hydraulic fluid to chamber 27 will substantially cease. Operation of the master cylinder will thereupon depend upon the preselected point at which passage 14 opens through the wall of bore 9.

For example, assume that the point at which passage 14 intersects the wall of bore 9 is so selected that piston 2 will lap said passage at about the same instant that the braking elements 31, when worn to the maximum permissible extent, engage the brake drum 32, and further assume that the braking elements are new or are worn to some extent less than said maximum permissible extent. Under this condition when during a braking application the braking elements 31 have been brought into engagement with the brake drum 32, further movement of piston 2 to the right will cause fluid to be displaced from chamber 15 to the chamber 11 via passage 14 for thereby shifting piston 4 leftward against the force of spring 5 until piston 2 laps passage 14 and thus traps hydraulic fluid in chamber 11; whereupon the hydraulic fluid in chambers 15 and 27 will be pressurized to a unit pressure corresponding to the value of the force applied via the lever 16 on the smaller piston 2 divided solely by the area of said piston for thereby producing a high braking force for a relatively low pedal force.

It will thus be noted that when passage 14 is so positioned as to be lapped at about the same instant that a braking element worn to the maximum permissible extent engages the brake drum 32, no brake adjustments are required for the useful life of the braking elements 31 and the degree of pedal travel for a brake application of any given degree is substantially constant irrespective of the extent of braking element wear.

On the other hand, if the braking elements 31 are expected to be adjusted periodically with wear thereon, according to the usual practice, or if the braking elements 31 are self-adjusting, then the point at which passage 14 intersects bore 9 is preferably so selected that passage 14 will be lapped off by piston 2 at about the same instant that displacement of hydraulic fluid to chamber 27 ceases; in other words, at substantially the instant that the braking elements 31 engage the drum 32. Under this condition, there will be no displacement of hydraulic fluid from chamber 15 to chamber 11 and hence no leftward movement of piston 4 relative to piston 2. When piston 2 laps passage 14, hydraulic fluid will be trapped in chamber 11 whereupon the hydraulic fluid in chambers 15 and 27 will be pressurized to a unit pressure corresponding to the value of the force applied via the lever 16 on the small piston 2 divided solely by the area of said piston.

If however, the passage 14 should be lapped, due to wear of the braking elements 31, before the latter have engaged the drum 32, piston 2 will move rightward independently of piston 4 and against the force of spring 5 for displacing fluid to chamber 27 to effect such engagement and then apply the pressurizing force directly to the hydraulic fluid for obtaining the aforementioned high braking pressure. The axial distance between retainer 6 and piston 4 and the compressed length of spring 5 are such that during normal operation under any of the conditions above described, no solid connection will be established between the pistons 2 and 4 via the retainer 6 and/or spring 5.

However, if, due to abnormal wear of the braking elements 31 or drum 32 or thermal expansion of the drum, piston 2 during a brake application laps passage 14 and hence causes piston 4 to be held stationary by the fluid trapped in chamber 11, and piston 2 moves rightward relative to piston 4 a predetermined distance without effecting sufficient displacement of hydraulic fluid to chamber 27 to effect engagement of the elements 31 with drum 32, then retainer 6 will abuttingly engage the skirt portion of piston 4; whereupon, continued application of force to piston 2 will cause pistons 2, 4 to be moved rightward in unison, piston 4 displacing fluid from chamber 14 via a spring-biased disc-shaped check valve 41 preferably carried, in a suitable manner, by piston 2; this check valve 41 permits flow of hydraulic fluid from chamber 11 to chamber 15 via a passageway 42 formed in piston 2 and constantly open to chamber 11.

To effect a release of brakes, the operator releases the force applied to the brake pedal 20. Upon a release of brakes return spring 36 urges the braking lever 16 leftward pivoting the lever 16 counterclockwise toward its aforementioned released position and thereby shifting piston 2 leftward and also, after engagement of collar 3 with piston 4, shifting piston 4 leftward. A spring biased check valve 43 is interposed between chamber 11 and reservoir 13 for permitting reservoir fluid at atmospheric pressure to flow into chamber 11 to offset the vacuum which will tend to be created in chamber 11 prior to opening of passage 14 to chamber 15; said check valve 43 preventing flow in the reverse direction. After passage 14 is uncovered to chamber 15, spring 35 will be effective to displace hydraulic fluid from chamber 27 to permit disengagement of the braking elements 31 from the drum 32 and also to chamber 11 for offsetting any vacuum resultant from displacement of piston 4; and after piston 4 uncovers compensating port 12, hydraulic fluid will flow to chamber 11 and to chamber 15, if required, to assure that the system will be filled in readiness for the next brake application.

Having now described the invention, what I claim as new and desire to secure by Letters Patent, is:

1. A master cylinder for hydraulic brake systems, said master cylinder comprising a casing having therein a fluid reservoir and two coaxially arranged bores, one of which is of larger diameter than the other, a cylindrical piston operative in said other bore and extending through said one bore to which piston force is manually applied in a brake applying direction resulting in a braking pressure on the fluid in said other bore, an annular piston operative in said one bore and having a central opening through which said cylindrical piston extends in slidable sealed relation, a collar fixed on said cylindrical piston, a spring-retainer disc fixed on said cylindrical piston in spaced relation to said collar, said collar and disc being on opposite sides of said annular piston, spring means seated on said spring-retainer disc and biasing said annular piston toward engagement with said collar, said casing providing an annular chamber in said one bore surrounding said cylindrical piston, a port in said casing through which fluid is supplied to said annular chamber in the normal or brake release position of said annular piston and which is closed upon initial movement of said annular piston with said cylindrical piston in the brake applying direction, said casing having a passage between said annular chamber and said other bore through which fluid in said annular chamber flows to said other bore upon initial displacement of said annular piston from its brake release position, said passage having an opening into said other bore which is closed off by said cylindrical piston upon a certain initial movement thereof in the brake applying direction, said cylindrical piston having a passageway therein establishing communication between said annular chamber and said other bore, a check valve preventing backflow of fluid from said other bore to said annular chamber through said passageway and allowing flow of fluid therepast from said annular chamber to said other bore notwithstanding closure of said passage in the casing if the fluid pressure developed in said annular chamber by pressure of the annular piston thereon exceeds the fluid pressure in said other bore, said spring being compressible to allow said spring-retainer disc to contact said annular piston thereby to cause the force manually applied to said cylindrical piston to be exerted also on said annular piston.

2. A master cylinder as claimed in claim 1, further characterized by a vacuum relief check valve in a communication in said casing means connecting said reservoir and said annular chamber for allowing fluid to flow from said reservoir to said annular chamber to prevent vacuum build-up due to the pressure of fluid in the latter chamber falling below that in said reservoir, such as may occur while said annular piston is moved toward said brake release position.

References Cited in the file of this patent
UNITED STATES PATENTS

| | | |
|---|---|---|
| 2,009,105 | Carroll | July 23, 1935 |
| 2,518,821 | Roy | Aug. 15, 1950 |
| 2,587,023 | Allyn | Feb. 26, 1952 |
| 2,590,430 | Risse | Mar. 25, 1952 |